(12) United States Patent
Hsieh

(10) Patent No.: US 7,782,216 B2
(45) Date of Patent: Aug. 24, 2010

(54) FAN DETECTING APPARATUS

(75) Inventor: Ming-Chih Hsieh, Taipei Hsien (TW)

(73) Assignee: Hon Hai Precision Industry Co., Ltd., Tu-Cheng, Taipei Hsien (TW)

( * ) Notice: Subject to any disclaimer, the term of this patent is extended or adjusted under 35 U.S.C. 154(b) by 376 days.

(21) Appl. No.: 11/951,287

(22) Filed: Dec. 5, 2007

(65) Prior Publication Data

US 2008/0286091 A1  Nov. 20, 2008

(30) Foreign Application Priority Data

May 18, 2007  (CN)  .................. 2007 1 0200646

(51) Int. Cl.
G08B 21/00  (2006.01)

(52) U.S. Cl. .................. 340/635; 340/693.5; 340/636.2; 340/680

(58) Field of Classification Search .................. 340/635, 340/693.5, 693.6, 584, 636.11, 636.17, 636.18, 340/636.2, 648, 649–680
See application file for complete search history.

(56) References Cited

U.S. PATENT DOCUMENTS

| 4,644,474 | A | * | 2/1987 | Aposchanski et al. | ....... 701/108 |
|---|---|---|---|---|---|
| 5,574,667 | A | * | 11/1996 | Dinh et al. | ................... 700/300 |
| 5,591,974 | A | * | 1/1997 | Troyer et al. | ............. 250/336.1 |
| 6,934,786 | B2 | * | 8/2005 | Irving et al. | ................. 710/300 |
| 2002/0063478 | A1 | * | 5/2002 | Huang et al. | ................ 307/149 |
| 2005/0050185 | A1 | * | 3/2005 | King et al. | .................. 709/223 |

* cited by examiner

*Primary Examiner*—Daniel Previl
(74) *Attorney, Agent, or Firm*—Frank R. Niranjan

(57) ABSTRACT

A fan detecting apparatus for detecting operation of at least two fans includes at least two airflow detecting units with two signal transmitting terminals, a judging unit with at least one judging terminal, and at least two identity indicating units electrically coupled to the corresponding at least two airflow detecting units respectively. The airflow detecting units detect airflow of the fans, and output control signals to corresponding identity indicating units when airflow from corresponding fans is no longer detected. Each of the identity indicating units has an identity code corresponding to a fan which is electrically coupled to the airflow detecting unit, and transmits the identity code to the judging terminal of the judging unit when it receives the control signal. The judging unit indicates which of the fans is no longer producing detectable airflow according to the identity codes received at its judging terminal.

6 Claims, 2 Drawing Sheets

FAN DETECTING APPARATUS

BACKGROUND

1. Field of the Invention

The present invention relates to detecting apparatuses, and particularly to a detecting apparatus which can detect whether fans in a computer room are working normally.

2. Description of Related Art

Developments in today's highly information-intensive society have led to remarkable improvements in performances of electronic devices. During operation of many contemporary electronic devices such as central processing units (CPUs), large amounts of heat are produced. Typically, fans are used to facilitate removal of heat in computers. The fans must be running stably, so as to prevent the computer from becoming unstable or being damaged. If the fans in a computer room run unstably or even cease running, heat generated from the CPUs will not be dissipated on time and will ruin the CPUs.

What is needed, therefore, is to provide a detecting apparatus which can detect operation of a plurality of fans in a computer room.

SUMMARY

An exemplary fan detecting apparatus for detecting operation of at least two fans includes at least two airflow detecting units with two signal transmitting terminals, a judging unit with at least one judging terminal, and at least two identity indicating units electrically coupled to the corresponding at least two airflow detecting units respectively. The airflow detecting units detect airflow of the fans, and output control signals to corresponding identity indicating units when airflow from corresponding fans is no longer detected. Each of the identity indicating units has an identity code corresponding to a fan which is electrically coupled to the airflow detecting unit, and transmits the identity code to the judging terminal of the judging unit when it receives the control signal. The judging unit indicates which of the fans is no longer producing detectable airflow according to the identity codes received at its judging terminal.

Other advantages and novel features of the present invention will become more apparent from the following detailed description of preferred embodiment when taken in conjunction with the accompanying drawings, in which:

DETAILED DESCRIPTIONS

Figure 1:
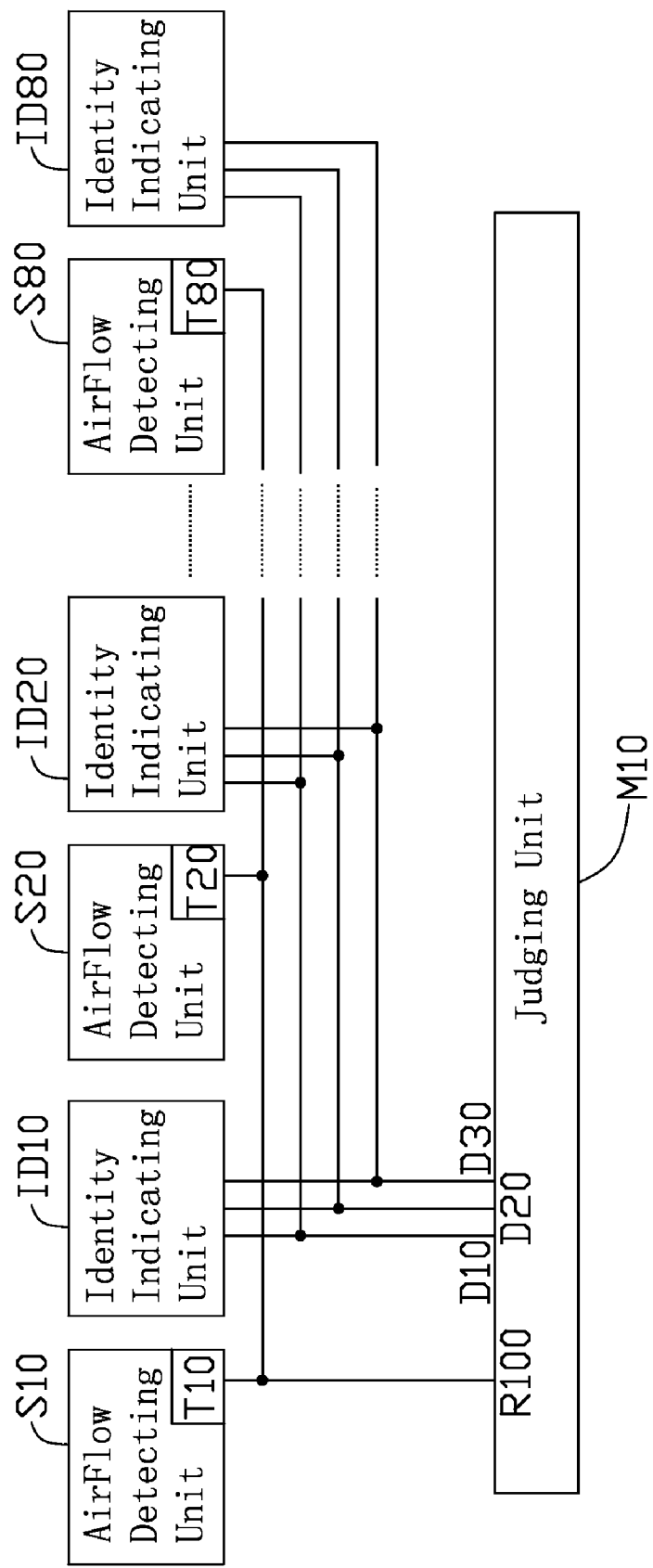
FIG. 1 is an schematic view of an embodiment of a fan detecting apparatus in accordance with the present invention.

Referring to FIG. 1, a fan detecting apparatus in accordance with an embodiment of the present invention includes a judging unit M10, eight airflow detecting units S10, S20, and so on through to S80, and eight identity indicating units ID10, ID20, and so on through to ID80. In this embodiment the fan detecting apparatus is used to detect 8 fans.

In this embodiment, the airflow detecting units S10~S80 are respectively disposed at air outlets of corresponding fans. Signal transmitting terminals T10, T20, and so on through to T80 of the airflow detecting units S10~S80 are all coupled to a signal receiving terminal R100 of the judging unit M10. Input terminals of the identity indicating units ID10~ID80 are respectively coupled to the signal transmitting terminals T10~T80 of the airflow detecting units S10~S80. Output terminals of the identity indicating units ID10~ID80 are respectively coupled to judging terminals D10, D20, D30 of the judging unit M10.

Figure 2:
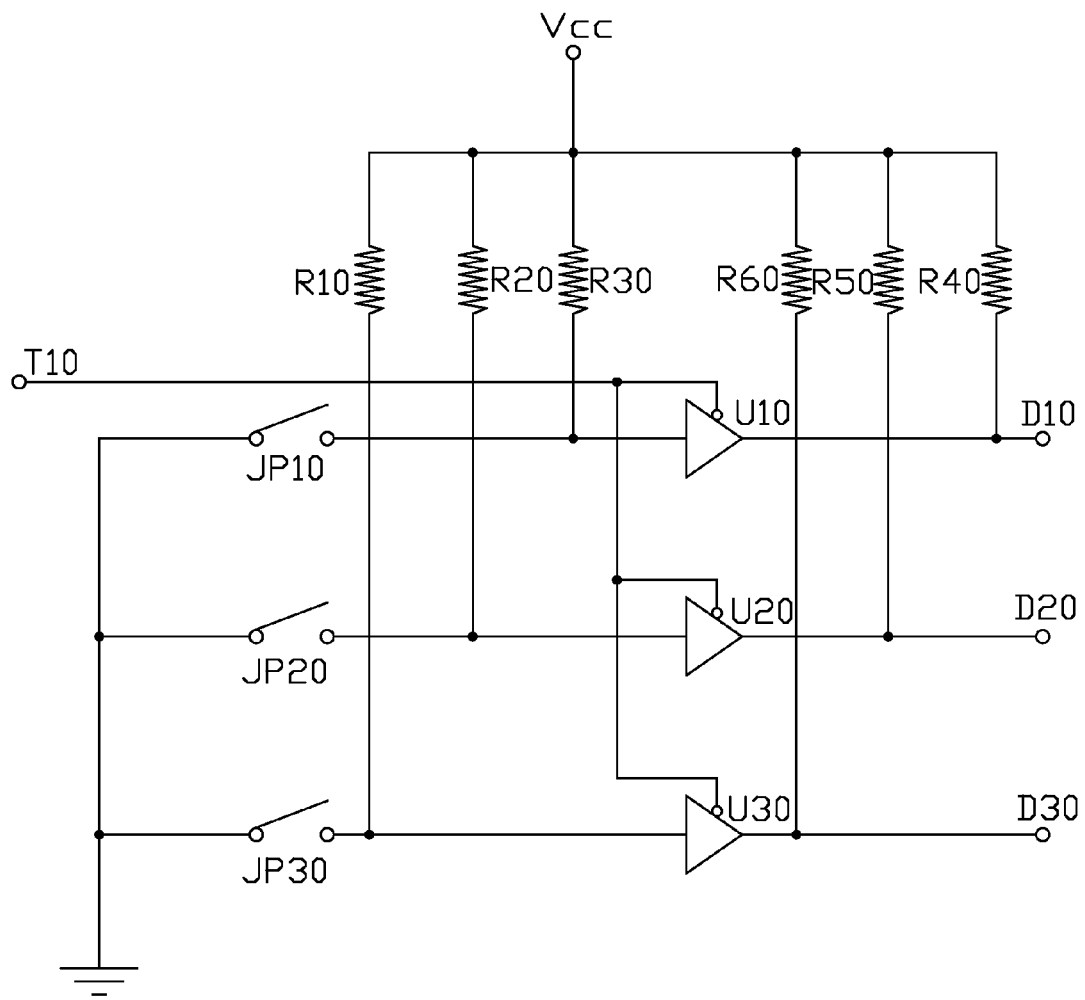
FIG. 2 is a circuit diagram of an identity indicating unit of FIG. 1.

Referring to FIG. 2, the identity indicating unit ID10 includes mechanical switches JP10, JP20, JP30, electronic switches U10, U20, U30, and resistors R10, R20, and so on through to R60. Control terminals of the electronic switches U10, U20, U30 are coupled to the signal transmitting terminal T10 of the airflow detecting unit S10. Input terminals of the electronic switches U10, U20, U30 are respectively coupled to terminals of the mechanical switches JP10, JP20, JP30, and coupled to a reference voltage Vcc via the resistors R30, R20, RIO. Output terminals of the electronic switches U10, U20, U30 are respectively coupled to the judging terminals D10, D20, D30 of the judging unit M10, and coupled to the reference voltage Vcc via the resistors R40, R50, R60. Another terminal of each of the mechanical switches JP10, JP20, JP30 is coupled to ground. When voltage at the control terminals of the electronic switches U10, U20, U30 is at a high level, voltage level signal at the input terminals of the electronic switches U10, U20, U30 are transmitted to the output terminals of the electronic switches U10, U20, U30.

Each of the identity indicating units ID10~ID80 has an identity code corresponding to a fan which is electrically connected to the airflow detecting unit. The identity codes are set by turning on or off of the mechanical switches JP10, JP20, JP30. When the mechanical switches JP10, JP20, JP30 turn on, voltage level signals at the input terminals of corresponding electronic switches U10, U20, U30 are at a low level. When the mechanical switches JP10, JP20, JP30 turn off, voltage level signals at the input terminals of corresponding electronic switches U10, U20, U30 are at a high level. In this embodiment, the logic 1 state corresponds to the logic high level, the logic 0 state corresponds to the logic low level. When the mechanical switches JP10, JP20, JP30 of the identity indicating unit ID10 are all on the identity code is 000, which corresponds to the fan electrically connected to the airflow detecting unit S10. The identity indicating units ID20~ID80 have the same electrical structure as the identity indicating unit ID10. That is, each of the identity indicating units ID20~ID80 has three mechanical switches and three electronic switches. The identity indicating units ID20~ID80 respectively have the identity codes 001, 010, 011, 100, 101, 110, 111.

If the airflow detecting unit S10 detects that the airflow from the corresponding fan is less than a predetermined value, it outputs a low level control signal at its signal transmitting terminal T10. The signal receiving terminal R100 of the judging unit M10 receives the low level control signal and indicates sufficient airflow is no longer detected from the corresponding fan. The low level control signal is also transmitted to the control terminals of the electronic switches U10, U20, U30, voltage level signals at the input terminals of the electronic switches U10, U20, U30 are transmitted to the output terminals of the electronic switches U10, U20, U30. So the identity code 000 of the identity indicating unit ID10 corresponding to the fan which is electrically connected to the airflow detecting unit S10 is transmitted to the judging terminals D10, D20, D30 of the judging unit M10. The judging unit M10 indicates that airflow from the fan, which is electrically connected to the airflow detecting unit S10, is below the predetermined value.

When airflow from any of the fans corresponding to the airflow detecting units S20~S80 drops below the predetermined value, the identity codes of corresponding identity indicating units are transmitted to the judging terminals D10, D20, D30 of the judging unit M10. Then the judging unit M10 indicates airflow from the corresponding fan or fans is below the predetermined value. It is to be noted that the judging unit may incorporate or be connected to an indicator such as a monitor, light emitting diodes, an audible alarm or other known indicating means in the art for indicating airflow from a fan or fans is below the predetermined value.

In this embodiment, the fan detecting apparatus detects eight fans. The detecting apparatus can detect more fans by increasing the amounts of the mechanical and electronic switches, and the resistors. For example, when the detecting apparatus includes four mechanical switches, four electronic switches, and eight resistors, the detecting apparatus can detect sixteen fans. Therefore the detecting apparatus can detect a plurality of fans according to airflow from the fans.

It is to be understood, however, that even though numerous characteristics and advantages of the present invention have been set forth in the foregoing description, together with details of the structure and function of the invention, the disclosure is illustrative only, and changes may be made in detail, especially in matters of shape, size, and arrangement of parts within the principles of the invention to the full extent indicated by the broad general meaning of the terms in which the appended claims are expressed.

What is claimed is:

1. A fan detecting apparatus for detecting operation of at least two fans in a computer room, comprising:
    at least two airflow detecting units each with a signal transmitting terminal configured for detecting status of a corresponding one of the at least two fans, the signal transmitting terminal of a corresponding airflow detecting unit outputting a control signal when airflow from the corresponding fan is no longer detected;
    a judging unit with at least one judging terminal configured for indicating which of the fans is no longer producing detectable airflow; and
    at least two identity indicating units electrically coupled to the signal transmitting terminals of the corresponding at least two airflow detecting units respectively, each of the identity indicating units having an identity code, corresponding identity code is transmitted to the judging terminal of the judging unit when either of the identity indicating units receives the control signal, wherein each of the identity indicating units comprises at least one mechanical switch, and at least one electronic switch coupled to the mechanical switch, the electronic switch comprises a control terminal, an input terminal, and an output terminal, the control terminal is coupled to the signal transmitting terminal of a corresponding airflow detecting unit, the input terminal is coupled to one terminal of the mechanical switch, and is coupled to a reference voltage via a resistor, the output terminal is coupled to the judging terminal of the judging unit, and is coupled to the reference voltage via another resistor, the other terminal of the mechanical switch is coupled to ground.

2. The fan detecting apparatus as claimed in claim 1, wherein the identity codes are set by turning on or off of the mechanical switch.

3. The fan detecting apparatus as claimed in claim 1, wherein the judging unit further comprises a signal receiving terminal coupled to the signal transmitting terminals of the airflow detecting units, and indicates sufficient airflow is no longer detected from the corresponding fan when receives the control signal.

4. The fan detecting apparatus as claimed in claim 1, wherein the airflow detecting units output the control signal when strength of airflow from corresponding fans is less than a predetermined value.

5. A fan detecting apparatus, comprising:
    at least two airflow detecting units configured for respectively detecting status of at least two fans, each of the airflow detecting units comprising a signal transmitting terminal, when airflow from corresponding fans is no longer detected, the signal transmitting terminal of a corresponding airflow detecting unit outputs a control signal;
    a judging unit configured for indicating which of the fans is no longer producing detectable airflow, the judging unit comprising at least one judging terminal, and a signal receiving terminal coupled to the signal transmitting terminals of the airflow detecting units; and
    at least two identity indicating units configured for receiving the control signal from corresponding airflow detecting units, each of the identity indicating units comprising an input terminal coupled to the signal receiving terminal of a corresponding airflow detecting unit, and at least one output terminal coupled to the at least judging terminal of the judging unit, and having an identity code which is transmitted to the judging terminal of the judging unit when corresponding identity indicating unit receives the control signal, wherein each of the identity indicating units comprises at least one mechanical switch, and at least one electronic switch coupled to the mechanical switch, the electronic switch comprises a control terminal, an input terminal, and an output terminal, the control terminal acting as the input terminal of the identity indicating unit is coupled to the signal transmitting terminal of a corresponding airflow detecting unit, the input terminal of the electronic switch is coupled to one terminal of the mechanical switch, and is coupled to a reference voltage via a resistor, the output terminal of the electronic switch acting as the output terminal of the identity indicating unit is coupled to the judging terminal of the judging unit, and is coupled to the reference voltage via another resistor, the other terminal of the mechanical switch is coupled to ground.

6. The fan detecting apparatus as claimed in claim 5, wherein the identity codes are set by turning on or off of the mechanical switch.

* * * * *